Dec. 15, 1959     G. A. LYON, JR     2,917,341
WHEEL COVER
Filed March 25, 1955     2 Sheets-Sheet 1
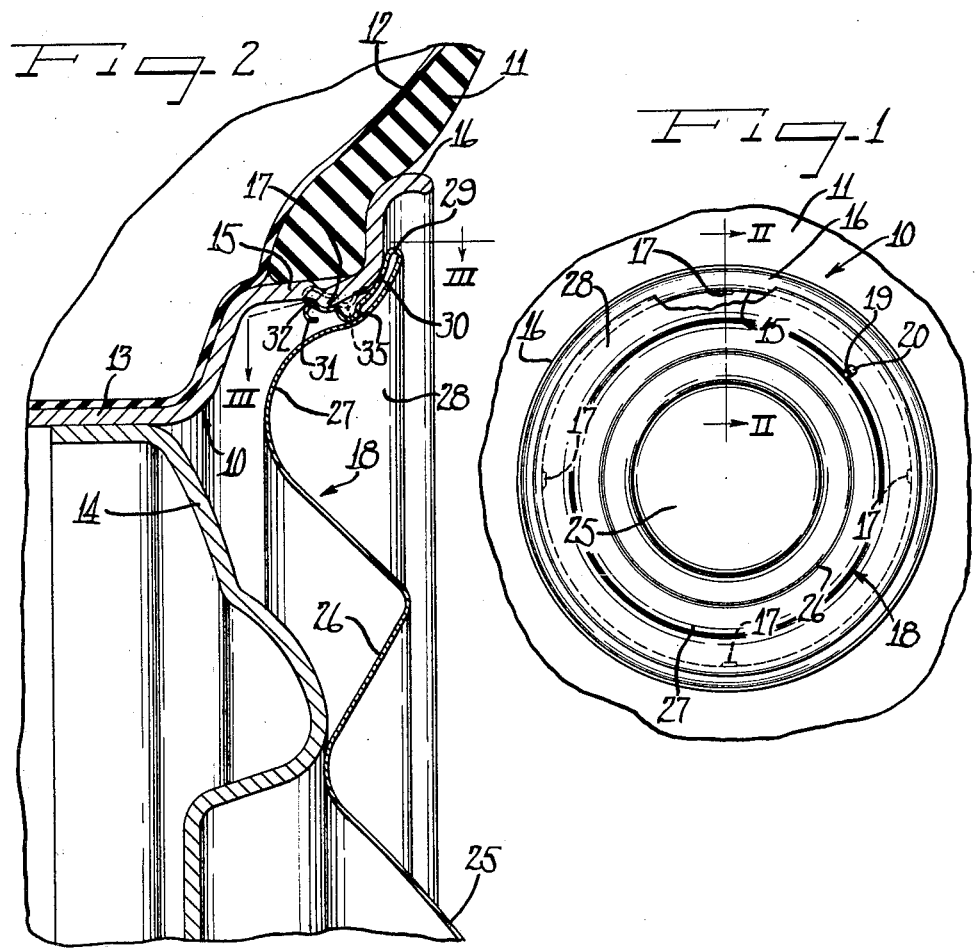
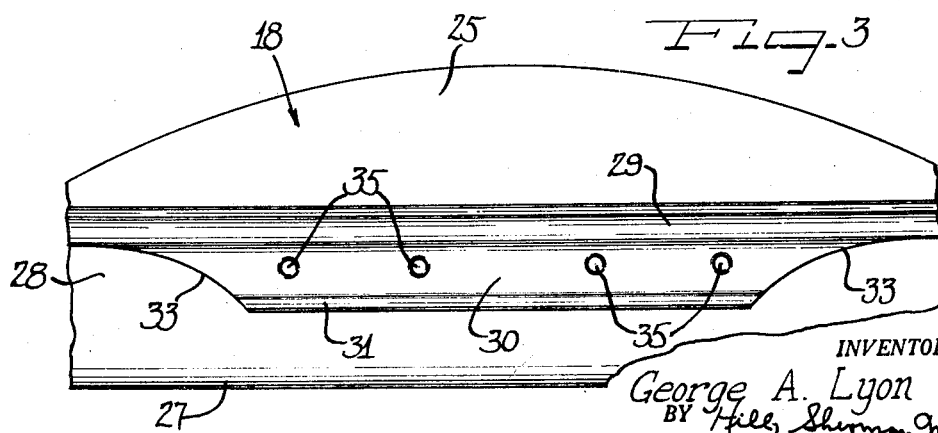
INVENTOR.
George A. Lyon Jr.

Dec. 15, 1959   G. A. LYON, JR   2,917,341
WHEEL COVER
Filed March 25, 1955   2 Sheets-Sheet 2
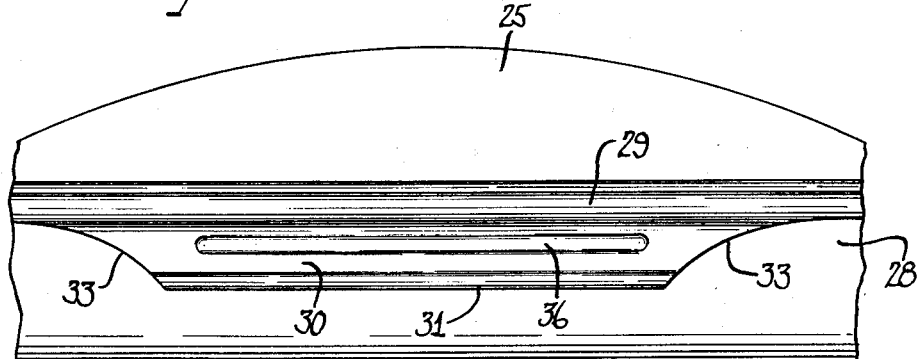
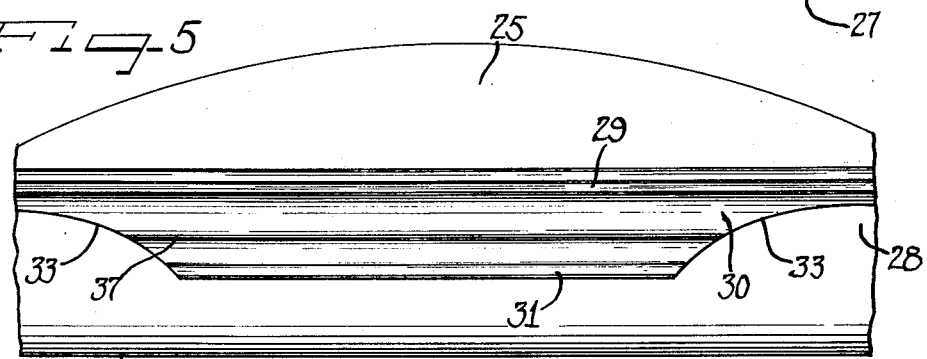
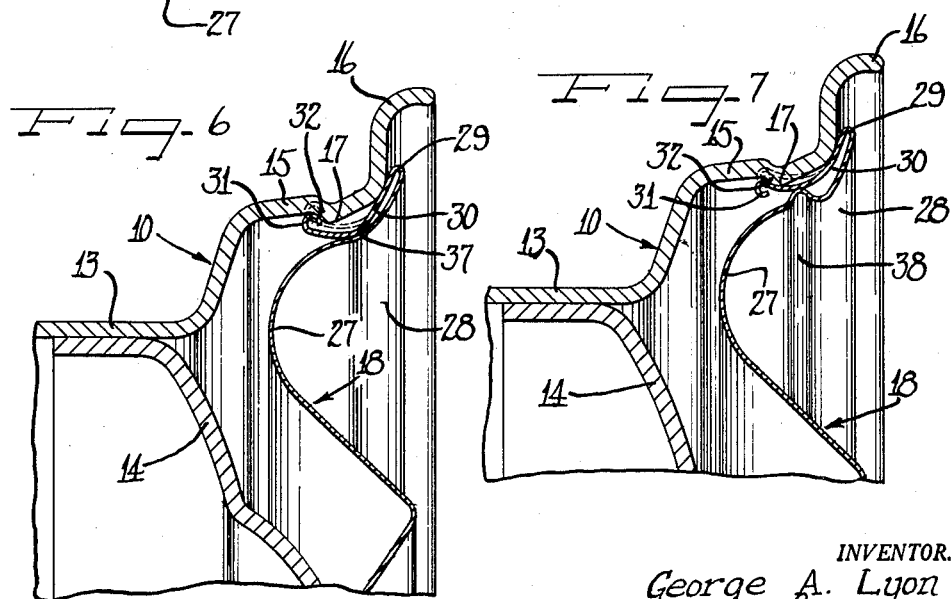
INVENTOR.
George A. Lyon Jr.

United States Patent Office 2,917,341
Patented Dec. 15, 1959

2,917,341

WHEEL COVER

George A. Lyon, Jr., Birmingham, Mich., assignor to Lyon Incorporated, Detroit, Mich., a corporation of Delaware Application March 25, 1955, Serial No. 496,725

5 Claims. (Cl. 301—37)

The present invention relates to improvements in wheel structures and more particularly concerns the provision of novel means for retaining a wheel cover on a wheel.

A principal object of the present invention is to provide a simple and efficient construction of retaining fingers for snap-on, pry-off interengagement between a wheel cover and a wheel.

Another object of the invention is to provide a wheel cover having novel cooperative back-up portions located on cover retaining fingers or on a cooperative portion of the associated wheel cover for increasing the resilient tension of the fingers as an incident to application of the cover to a wheel.

A further object of the invention is to provide novel back-up projection means for improving the retaining characteristics of finger extensions on a vehicle wheel cover.

Other objects, features and advantages of the present invention will more fully appear from the following detailed description of certain preferred embodiments thereof taken in conjunction with the accompanying drawings, in which:

Figure 1 is a side elevational view of a wheel structure embodying features of the present invention.

Figure 2 is an enlarged fragmentary radial sectional view taken substantially on the line II—II of Fig. 1.

Figure 3 is a fragmentary edge elevational view of the cover of Fig. 2, apart from the wheel, and taken substantially on the line III—III of Fig. 2, showing one of the cover retaining fingers.

Figure 4 is a fragmentary edge elevational view similar to Fig. 3 but showing a modified form of the cover-retaining finger.

Figure 5 is a plan view similar to Fig. 3 but showing another modification of the cover-retaining finger.

Figure 6 is a fragmentary radial sectional view similar to Fig. 2, but showing use of the modification of Fig. 5; and Figure 7 is also a view similar to Fig. 2 but showing a further modification of the invention.

Referring to Figures 1-3, the invention is shown in association with a vehicle wheel such as an automobile wheel, including a drop-center type of tire rim 10 having a pneumatic tire and tube assembly 11, 12 or a tubeless tire, as may be preferred. The tire rim 10 comprises a base flange 13 secured in a suitable manner to a disk spider wheel body part 14. From the outer side of the base flange 13 extends radially and axially outwardly a side flange which merges with an intermediate flange 15, in turn joining a radially and then axially outwardly extending terminal flange 16.

The intermediate flange 15 of the tire rim has a plurality, such as four, equi-distantly spaced cover retaining protuberances or bumps 17 extending radially inwardly from the inner periphery of the axially outer portion thereof for engagement by retaining means on a wheel cover 18. A valve stem 19, as shown in Fig. 1, extends from the rim side flange in the usual way and is accessible through an aperture 20 located adjacent the periphery of the cover member 18.

In the present instance, the wheel cover 18 is shown in the form of a circular full disk cover that will cover over substantially the entire wheel, but it may also be in the form of a trim ring. Therefore the term "cover" should be understood herein as including either a full disk or a trim ring cover member.

By preference the wheel cover 18 is stamped from relatively thin sheet material such as stainless steel, brass or other sheet metal in strip or other blank form. Such material lends itself readily to suitable finishing such as by polishing and plating or other decorative finish.

In the present instance the cover 18 includes a central generally axially outwardly projecting crown portion 25 that overlies the central portion of the wheel body 14. About the radially outer portion of the crown 25 is an annular generally axially outwardly projecting rib portion 26 at the radially outer side of which is an axially inwardly dished annular portion 27 that projects down into the substantial groove between the wheel body and the tire rim. Extending generally axially and radially outwardly at the radially outer side of the inwardly dished portion 27 is an outer marginal portion 28 which is of a diameter to overlie the tire rim over the intermediate flange 15 and the adjacent portion of the terminal flange 16.

For reinforcing and finishing the edges of the cover, an underturned flange 29 is provided at the outer extremity of the cover portion 28. This flange 29 extends generally radially inwardly and has extending therefrom generally radially and axially inwardly a circumferentially spaced series of finger extensions 30 which are preferably four in number for alignment with and retaining engagement with the retaining bumps 17 on the tire rim. As will be apparent from Fig. 2, the retaining fingers 30 diverge from the adjacent cover portion 28 so as to extend into a substantial annular space between the cover portion 28 and the tire rim 15 in the assembled relationship of the cover on the outer side of the wheel.

Normally, and before attachment of the cover to the outer side of the wheel, the retaining fingers project at inner end turned terminals 31 radially outwardly to a diameter which is at least slightly greater than the diameter described about the intermediate flange 15 at the inner ends of the retaining bumps 17, substantially as shown in dash outline in Fig. 2. Accordingly, in applying the cover to the outer side of the wheel, as the retaining fingers 30 are pressed axially inwardly to cam axially inwardly and radially inwardly along the outer faces of the retaining bumps 17, the retaining fingers are caused to flex resiliently radially inwardly until the turned terminals 31 thereof snap into engagement with generally axially inwardly facing retaining shoulders 32 on the retaining bumps 17. The construction and relationship is such that when the retaining terminals 31 are in retaining engagement with the shoulders 32, the underturned outer marginal flange 29 is drawn snugly against the shoulder at the axially outer end of the intermediate flange 15 at juncture with the radially extending portion of the intermediate flange 16.

As best seen in Fig. 3, each of the retaining fingers 30 is of substantial width with the side edges thereof flaringly tapered into the underturned flange 29. Furthermore, the retaining fingers being of substantial width are curved preferably generally concentrically with the circumference of the cover, and the retaining terminals 31 together with such structure of the fingers assure substantial resilient resistance to radial deflection of the fingers as they are manipulated in conjunction with the retaining bumps 17.

However, it is desirable to provide the retaining fingers 30 with substantial additional resiliency-enhancing means to assure thoroughly secure gripping interengagement of the fingers with the retaining bumps 17. To this end, novel back-up tensioning means are provided to be operable in at least the final phase of interengagement of the fingers with the retaining bumps. Herein such means comprise abutment structure operable to shorten the flexure leverage of the retaining fingers in said final phase of retaining interengagement with the retaining bumps.

In one form, such flexure leverage abutment means comprise, as best seen in Figs. 2 and 3, a circumferentially aligned spaced series of radially inwardly projecting nodes 35 formed as by dimpling the metal of the retaining fingers 30 at an intermediate portion thereof, that is spaced from both the axially outer and axially inner ends thereof. The abutments nodes 35 are engageable with the opposing inner face of the cover 18 and more particularly the oblique outer marginal cover portion 28.

Thus, as the cover is applied to the outer side of the wheel, the retaining fingers 30 flex radially inwardly as they move over the retaining bumps 17 and before the finger terminals 32 move resiliently flexibly radially inwardly to the extent necessary to pass by the tips of the retaining bumps 17, the abutment nodes 35 back against the cover portion 28 and thus tend to stop further radially inward flexing. However, since a substantial length of the retaining fingers extends axially inwardly beyond the back-up projections 35, the terminal portions 31 of the retaining fingers are enabled to flex radially inwardly to the slight extent necessary to pass the tips of the retaining bumps and then snap under substantial resilient tension against the retaining shoulders 32 of the bumps.

Since under the resilient deflection of the retaining fingers in engagement with the retaining bumps 17, the back-up projections 35 maintain their backed-up relation to the back of the cover, continuous resilient tensioning of the retaining fingers 30 persists until the cover is removed from the wheel as by applying a pry-off tool behind the underturned marginal edge 29 and the fingers snapped from engagement with the retaining bumps.

In the modification of Fig. 4, instead of a plurality of spaced projections or nodes, the retaining fingers 30 are provided with an elongated radially inwardly projecting rib 36 which extends circumferentially short of the opposite sides 33 of the retaining finger, but follows the circumferential arched contour of the retaining finger body. The rib 36 operates in service the same as the back-up projections 35. That is, the rib 36 backs up against the adjacent inner face of the outer marginal portion 28 of the cover.

In the modification of Figs. 5 and 6, a generally V-shaped indented transverse radially inwardly projecting rib 37 is provided to extend entirely across the retaining finger 30 and runs out at the opposite edges 33 thereof. The ridge of the rib 37 backs up against the outer annular cover portion 28 in similar fashion as the nodes 35 or the back-up discontinuous rib 36.

In the further modification shown in Fig. 7, the cover portion 28 is provided with an annular radially outwardly projecting narrow rib 38 which is disposed in back-up relation to the axially intermediate portions of the retaining fingers 30 and functions substantially the same as the projections on the retaining fingers themselves as shown in Figs. 2, 4 and 5.

In all forms of the invention, the cover member 18 may be easily applied to the wheel rim by pressing the cover axially inwardly until the terminals 31 of the retaining fingers snap behind the retaining bumps. In all forms the back-up projection structure intermediately of the retaining fingers shortens the flexure leverage of the fingers and enhances the retaining resilient tension of the retaining fingers in engagement with the retaining bumps.

It will be understood that modifications and variations may be effected without departing from the scope of the novel concepts of the present invention.

I claim as my invention:

1. In a wheel structure including an annular radially facing flange, a cover for disposition at the outer side of the wheel including a circular sheet metal cover member having a generally radially extending annular part thereof for overlying said annular wheel flange and provided with a portion extending generally axially from said part and disposed in assembly in substantially telescoped but spaced relation to said wheel flange, a plurality of cover retaining sheet metal fingers having body portions extending generally axially inwardly from generally radially extending flange structure carried by the cover behind said cover part and with the finger body portions disposed in the space between said cover portion and the wheel flange, said fingers being of substantial width and provided with side edges extending at their axially outer ends to juncture with said flange structure, the inner free extremities of the fingers having terminals retainingly engageable with said annular wheel flange, said finger body portions opposing said cover portion in spaced relation, and back-up structure indented in one of said portions and projecting into back-up flexure leverage shortening relation to the other of said portions intermediately of the length of said finger body portions spaced axially inwardly relative to said juncture of the body portions with said flange structure and to the axially outer ends of the finger body side edges and also spaced axially outwardly from said retaining terminals and disposed along a transverse line that runs out through said side edges.

2. In a wheel structure as defined in claim 1, and wherein said back-up and flexure leverage shortening structure comprises a series of circumferentially spaced dimples in the body portion of each of the retaining fingers projecting toward back-up engagement with said cover portion along said transverse line.

3. A wheel structure as defined in claim 1 wherein said indented back-up and flexure leverage shortening structure comprises a circumferentially elongated rib projecting from each of the retaining finger body portions toward said cover portion along said transverse line.

4. In a wheel structure as defined in claim 1, wherein said back-up and flexure leverage shortening structure comprises an annular rib in said cover portion and projecting toward the finger body portions along said transverse line.

5. A wheel structure as defined in claim 1 wherein said annular wheel flange has a circumferentially spaced series of retaining bumps projecting therefrom toward said fingers between said indented back-up structure and said terminals and the finger terminals are turned for retainingly engaging under resilient tension with the retaining bumps and in such resilient tension being resiliently reinforced by engagement of said indented back-up structure and thus shortening of the resilient deflectional leverage of the fingers.

References Cited in the file of this patent

UNITED STATES PATENTS

| | | |
|---|---|---|
| 2,624,635 | Lyon | Jan. 6, 1953 |
| 2,624,640 | Lyon | Jan. 6, 1953 |
| 2,640,730 | Lyon | June 2, 1953 |
| 2,675,272 | Hautau | Apr. 13, 1954 |

FOREIGN PATENTS

| | | |
|---|---|---|
| 830,302 | Germany | Feb. 4, 1952 |